May 29, 1956　　　C. L. CALOSI ET AL　　　2,748,298
ULTRASONIC VIBRATORY DEVICES
Original Filed March 15, 1951　　　3 Sheets-Sheet 1
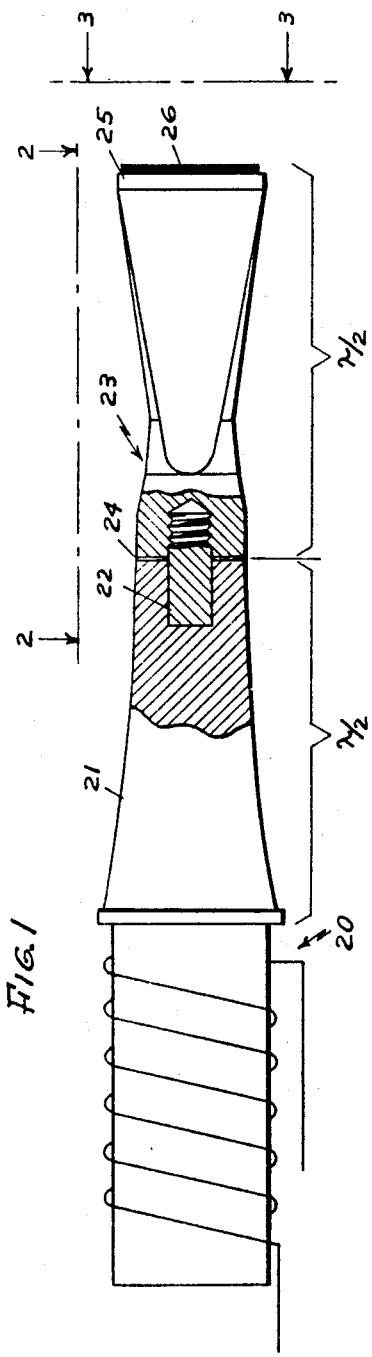
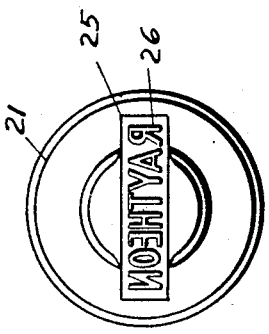
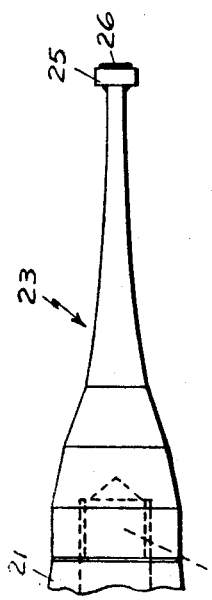
INVENTORS
CARLO L. CALOSI AND
PRESTON B. CARWILE, DECEASED
by Lois C.K. Carwile, Executrix
BY
ATTORNEY May 29, 1956  C. L. CALOSI ET AL  2,748,298
ULTRASONIC VIBRATORY DEVICES
Original Filed March 15, 1951  3 Sheets-Sheet 2
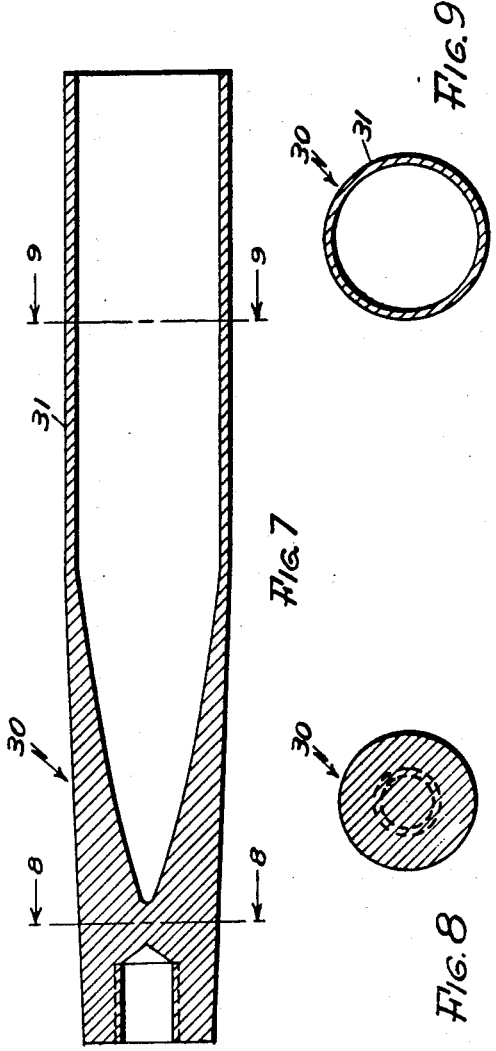
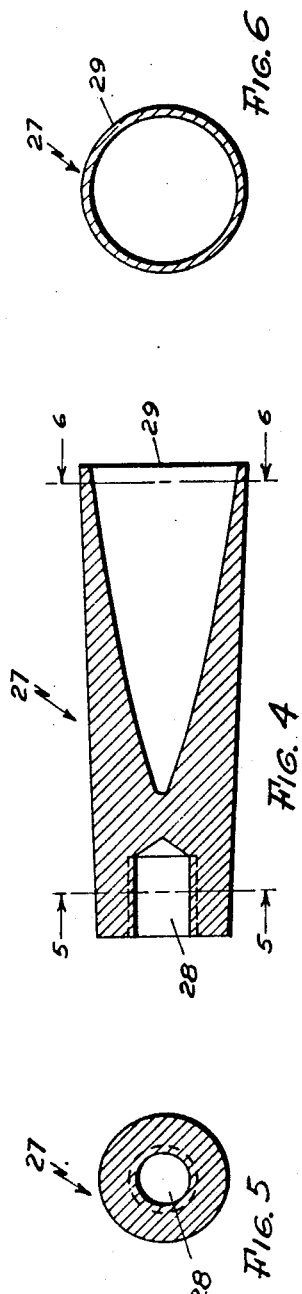
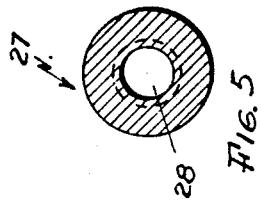
INVENTORS
CARLO L. CALOSI AND
PRESTON B. CARWILE, DECEASED
by LOIS C. K. CARWILE,
BY Elmer J. Jones  Executrix
ATTORNEY

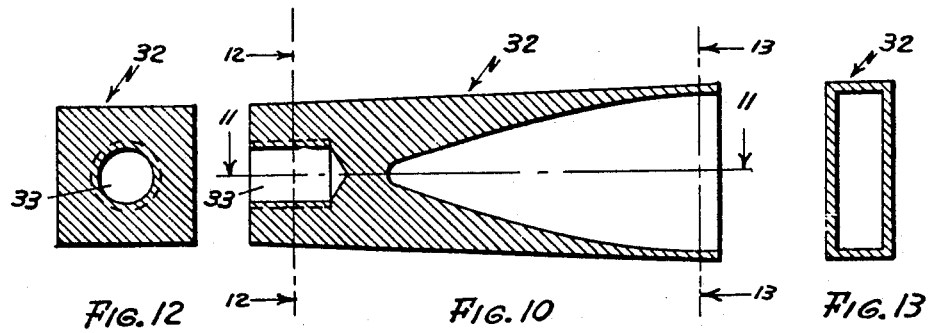
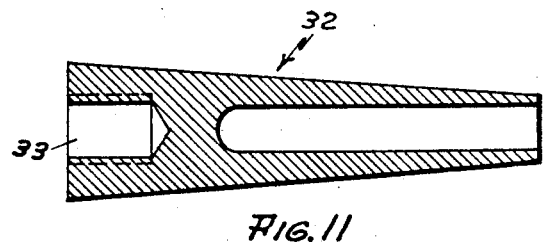
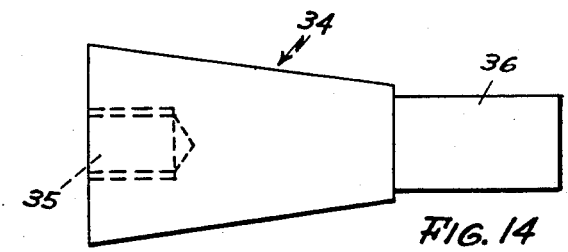
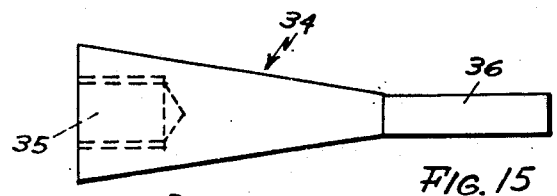
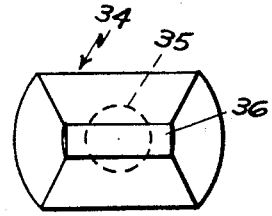

United States Patent Office 2,748,298
Patented May 29, 1956

2,748,298

ULTRASONIC VIBRATORY DEVICES

Carlo L. Calosi, Rome, Italy, and Preston B. Carwile, deceased, late of Cambridge, Mass., by Lois C. K. Carwile, executrix, Cambridge, Mass., assignors to Raytheon Manufacturing Company, Newton, Mass., a corporation of Delaware Original application March 15, 1951, Serial No. 215,844, now Patent No. 2,704,333, dated March 15, 1955. Divided and this application January 12, 1955, Serial No. 481,296

9 Claims. (Cl. 310—26)

This application is a division of application, Serial No. 215,844, filed March 15, 1951, by Carlo L. Calosi and Preston B. Carwile, now Patent No. 2,704,333, dated March 15, 1955.

This invention relates to vibratory devices, and more particularly to tool holders for drilling apparatus, said tool holders acting as vibratory energy transformation devices, and having a variety of particular shapes and contours.

In copending application, Serial No. 197,023, filed November 22, 1950, by Preston B. Carwile, now abandoned, there is disclosed a vibratory drilling device wherein the larger end of a truncated metallic cone is connected to a source of mechanical vibrations. The vibrations, which are of the compressional wave energy type, travel longitudinally along the cone, increasing in amplitude as they progress from the larger end to the smaller end thereof. With this structure, the maximum transverse dimension is restricted to substantially the diameter of the smaller end of the cone to which the tool is connected, since, if the tool is made much larger than the cone portion connected thereto, the overhanging portions of the tool will usually fracture during operation of the structure.

It has now been discovered that the tapered portion of an elongated body used for transferring vibrational energy from the source to the work need not necessarily have a transverse, cross-sectional area with a solid contour. Furthermore, the shape of said contour may be of any desired design or configuration, and in particular the shape of said contour may be gradually varied with respect to displacement along the longitudinal axis of said body.

In particular, this invention discloses that the rate of change of the area of the transverse cross section of said body with respect to displacement along the longitudinal axis thereof may be different from the rate of change of the square of the linear dimensions of said cross section with respect to said displacement.

It has been found that the change in contour may be incorporated in the same resonant system as the vibrational amplitude transforming body.

It has further been discovered that the gradual change in contour may be accomplished in the same portion of the elongated body and concurrently with the gradual change in cross-sectional area required to produce the increase in vibrational amplitude.

In a specific embodiment of the invention disclosed herein, the transverse, cross-sectional area gradually decreases along the tool holder from the point of attachment to the vibrational source toward the end of the tool holder which drives the tool, while the contour of said cross-sectional area gradually changes from a circular contour to an elongated, rectangular contour.

Another embodiment of the invention discloses that the contour of the cross-sectional area may change gradually along the length of the body from a solid circular contour to a hollow circular contour, or from a solid rectangular contour to a hollow rectangular contour, while the cross-sectional area gradually decreases.

This invention further discloses that the amplitude at the free end of the tapered elongated body may be increased by concentrating a larger mass at the free end of said body, for example, by attaching to said free end a body having a mass per unit length along the longitudinal axis of the tapered body, which is substantially greater than the mass per unit length of the tapered body along the longitudinal axis adjacent the free end thereof.

This invention further discloses that, for best results, the point of connection of the elongated device to the source of mechanical vibrations and the free end of the elongated member which may be used to apply the high amplitude vibrations to the desired work are preferably antinodes of the vibratory motion when operated at the desired operating frequency, and that said antinodes may be one or more half wave lengths apart.

Other and further objects and advantages of this invention will be apparent as the description thereof progresses, reference being had to the accompanying drawings, wherein:

Fig. 1 illustrates a partially broken away view of a vibratory device illustrating one embodiment of the invention;

Fig. 2 illustrates an elevation view of the embodiment of the invention illustrated in Fig. 1, taken along line 2—2 of Fig. 1.

Fig. 3 illustrates a further elevation view of the device shown in Fig. 1, taken along line 3—3 of Fig. 1;

Fig. 4 illustrates a longitudinal, cross-sectional view of a further embodiment of this invention showing a tapered tool holder, wherein the end having the smaller transverse, cross-sectional area has an annular contour;

Fig. 5 illustrates a transverse, cross-sectional view of the device shown in Fig. 4, taken along line 5—5 of Fig. 4;

Fig. 6 illustrates a further cross-sectional view of the device shown in Fig. 4, taken along line 6—6 of Fig. 4;

Fig. 7 illustrates a longitudinal, cross-sectional view of a still further embodiment of this invention, wherein the device illustrated in Fig. 4 has been elongated by a hollow, cylindrical member substantially a half wave length long at the operating frequency of said device;

Fig. 8 illustrates a transverse, cross-sectional view of the device shown in Fig. 7, taken along line 8—8 of Fig. 7;

Fig. 9 illustrates a further transverse, cross-sectional view of the device shown in Fig. 4, taken along line 9—9 of Fig. 7;

Fig. 10 illustrates a longitudinal, cross-sectional view of a still further embodiment of this invention;

Fig. 11 illustrates a cross-sectional view of the device shown in Fig. 10, taken along line 11—11 of Fig. 10;

Fig. 12 illustrates a transverse, cross-sectional view of the device shown in Fig. 10, taken along line 12—12 of Fig. 10;

Fig. 13 illustrates a further transverse, cross-sectional view of the device shown in Fig. 10, taken along line 13—13 of Fig. 10;

Fig. 14 illustrates an elevation view of a still further embodiment of the invention;

Fig. 15 illustrates a further elevation view of the device shown in Fig. 14; and Fig. 16 illustrates an additional elevation view of the device shown in Figs. 14 and 15.

Referring now to Figs. 1 through 3, there is shown a source of mechanical vibrations 20 which may be, for example, as shown here, a magnetostrictive transducer of the type which is described in greater detail in the aforementioned copending application. Attached to vibratory source 20 is an elongated tapered member 21, the larger end of the tapered member 21 being attached to the source 20, and the smaller end of the member 21 extending away from source 20. Embedded in the smaller end of member 21 coaxial therewith is a stud 22, the portion of the stud 22 which extends outwardly from the end of member 21 being threaded. A tool holder 23 is threadedly attached to the smaller end of member 21 by means of stud 22. A washer of resilient material 24 is placed between members 21 and 23 to insure uniformly firm seating and to prevent abrasion of the opposing surfaces of said members due to any vibratory motion at this joint. While the tapered member 21, as shown here, is a half wave length long, it is to be clearly understood that said member may be any desired number of half wave lengths long at the operating frequency of the device. The member 23, as shown here, is also a half wave length long, but may be any desired number of half wave lengths long.

While the cross-sectional area of the member 23 as it extends away from member 21 is continuously and gradually reduced in size, the shape of said cross-sectional area is varied, changing from a circular contour at its point of juncture to member 21 to a rectangular contour at its free end. While the dimensions of the rectangular contour may be varied considerably within the scope of this invention, the device illustrated herein has the longer sides of the rectangular cross section at the free end of member 21 considerably longer than the diameter of members 21 or 23 at their point of juncture. Conversely, the shorter sides have a length which is considerably less than the diameter of members 21 and 23 at their point of juncture.

Thus, it may be seen that, while one of the dimensions of the rectangular, cross-sectional area has been gradually increased, the other of the dimensions has been decreased at a greater rate, and, as a result, the overall area of the cross section at the free end of the member 23 is less than at the juncture of members 21 and 23. Hence, the amplitude of the compressional wave vibrations at the free end of member 23 will be considerably increased over the amplitude of the vibrations applied to the larger end of member 21 by the vibration source 20.

Attached to the free end of member 23 is a member 25 which may be considered the tool proper. As shown here, member 25 has affixed thereto a raised emblem 26 which is adapted to impinge on the material to be drilled, whereby the outline of said emblem may be cut into said material. It has been discovered that, by making the mass per unit length of the tool 25 considerably larger than the mass per unit length of the free end of the member 23 to which member 25 is attached, the amplitude of the vibrations appearing at the free end of member 23 may be substantially increased. This is believed to result from the fact that the stress applied to any incremental portion of the member 23 is proportional to the total mass of the member 23 and tool 25 which is on the opposite side of said portion from the vibratory source. Hence, if a larger mass is concentrated at the free end of the member 23, a larger stress will be applied over a greater portion of the length of member 23, and hence a greater average strain produced therein. Since strain is elongation per unit length, increasing the average strain will increase the amplitude of the overall elongation of member 23.

Referring now to Figs. 4, 5 and 6, there is shown another embodiment of the invention. There is shown herein a tool holder 27 which may be attached to the member 21 in Fig. 1 in place of the tool holder 23 by means of the stud 22. Member 27 is elongated in shape and has an outer contour which is circular. At one end thereof, there is a threaded hole 28 adapted to engage the stud 22 of Fig. 1. The diameter of member 27 increases gradually as it extends away from the end containing the hold 28, while the area of the cross section of member 27 gradually decreases as it extends away from the end containing the hole 28. This is accomplished by hollowing out the inside of member 27, preferably such that the section is tapered substantially exponentially with respect to axial distance, with the cross section of the conical shape being substantially circular. Thus, the end of member 27 which is free comprises a thin ring, as at 29, said ring being useful, for example, for drilling annular recesses in materials such as jewels or ceramics and for cutting or cleaning disks or holes therein. While the member 27 shown herein is made from a single piece of metal, the end 29 of member 27 may be made of a separate piece of metal which would comprise the tool proper, said piece being suitably tempered and attached to the end of member 27, for example, by soldering. If desired, the tool may overhang the tool holder to provide clearance for the tool holder or for other reasons.

Referring now to Figs. 7, 8 and 9, there is shown a still further embodiment of the invention, wherein the member 23 of Fig. 1 is replaced by a member 30. Member 30, for the first half wave length as it extends away from member 21, is substantially similar to member 27, illustrated in Figs. 4, 5 and 6. However, the member 30 extends for an additional half wave length beyond the first half wave length illustrated in Figs. 4, 5 and 6, said extension being in the form of a cylinder 31 which is hollow, and the cross-sectional contour of which is substantially similar to the end 29 of the embodiment of Figs. 4, 5 and 6. Thus, it may be seen that the tool holder, as illustrated by member 30, may be any desired number of half wave lengths long such that a deep recess may be cut into the material being drilled.

Referring now to Figs. 10, 11, 12 and 13, there is shown a member 32 which may be substituted for the member 23 of Fig. 1. Member 32, which is elongated, has a threaded hole 33 in one end thereof adapted to engage stud 22 of Fig. 1. The cross-sectional shape of this end of member 32 is square. However, if desired, it could be circular. The contour of member 32 is gradually changed with displacement longitudinally along member 32 from the hole 33 until at the other end of member 32 the cross-sectional contour is a hollow rectangle. This is accomplished by hollowing out the interior of the member 32 such that the cross-sectional area of the member 32 preferably decreases as a substantially exponential function as it approaches the free end of member 32. With this tool holder, a rectangular recess may be cut into the material being drilled.

Referring now to Figs 14 through 16, there are shown three elevational views of a further embodiment of this invention, wherein a member 34 is illustrated which may replace member 23 of Fig. 1. Member 34 is elongated and has a hole 35 in one end thereof which is adapted to engage the stud 22 of Fig. 1. The cross-sectional contour of the member 34 at the point of juncture with member 21 is a modified rectangle with one pair of the opposite sides of the rectangle being straight, and the other pair of opposite sides being formed of arcs of a circle whose center is the center of the rectangle and lies on the longitudinal axis of member 34. Member 34 is a truncated pyramid with the hole 35 being in the base of the pyramid. The diagonal of the base of the pyramid may be made somewhat greater in length than the diameter of member 22 at the point of juncture with member 34 such that the abutting areas are substantially equal. Projecting from the truncated end of the pyramidal member 34 is an oblong member 36, which may be considered a tool proper, on to which a tool may be attached. The free end of member 36 will have vibrations which are considerably larger in amplitude than those applied to the member 21 by vibration source 20. This structure may be used, for example, as a chisel, a tamp, or for other applications.

It should be noted that all of the modifications illustrated in Figs. 1 through 16 should have a tool holder length which is a multiple of a half wave length of the operation frequency. While it is to be clearly understood that any desired frequency may be used for the device, ultrasonic frequencies, for example, between twenty and thirty kilocycles, are desirable since they allow an increased rate of cutting for a given amplitude of vibration than do audible frequencies, and produce no objectionable audible sound.

This completes the description of the embodiments of the invention illustrated herein. However, many modifications thereof will be apparent to persons skilled in the art without departing from the spirit and scope of this invention. For example, any desired contour of the free end of the tool holder may be produced, and any desired material may be used for the tool holder. In addition, any desired type of tool may be attached to the free end of the tool holder. Accordingly, it is desired that this invention be not limited by the particular details described herein, except as defined by the appended claims.

What is claimed is:

1. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, a portion of said medium decreasing in cross-sectional area as it extends away from said source and having a first rate of change of the transverse cross-sectional area thereof with respect to displacement along the longitudinal axis and a second rate of change of the square of a cross-sectional dimension of said medium with respect to said displacement, said first rate of change being different than said second rate of change, and impact tool means at the free end of said medium.

2. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, the unattached end of said medium being hollow, and impact tool means at the free end of said medium, which medium has a discontinuity between said source and said impact tool.

3. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, and impact tool means connected to and defining a substantially rectangular cavity at the free end of said medium, which medium has a discontinuity between said source and said impact tool.

4. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, the unattached end of said medium being hollow, said medium being substantially a plurality of half wave lengths long at the operating frequency of said device, and impact tool means at the free end of said medium, which medium has a discontinuity between said source and said impact tool.

5. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, a portion of said medium having a first rate of change of the transverse cross-sectional area thereof with respect to displacement along the longitudinal axis and a second rate of change of the square of a cross-sectional dimension of said medium with respect to said displacement, the unattached end of said medium being hollow, said first rate of change being different than said second rate of change, and impact tool means at the free end of said medium.

6. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, a portion of said medium having a first rate of change of the transverse cross-sectional area thereof with respect to displacement along the longitudinal axis and a second rate of change of the square of a cross-sectional dimension of said medium with respect to said displacement, the unattached end of said medium having a substantially rectangular aperture therein, said first rate of change being different than said second rate of change, and impact tool means at the free end of said medium.

7. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, a portion of said medium decreasing in cross-sectional area as it extends away from said source and having a first rate of change of the transverse cross-sectional area thereof with respect to displacement along the longitudinal axis and a second rate of change of the square of a cross-sectional dimension of said medium with respect to said displacement, the unattached end of said medium being hollow, said medium being substantially an integral number of half wave lengths long at the operating frequency of said device, said first rate of change being different than said second rate of change, and impact tool means at the free end of said medium.

8. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, a portion of said medium decreasing in cross-sectional area as it extends away from said source and having a first rate of change of the transverse cross-sectional area thereof with respect to displacement along the longitudinal axis and a second rate of change of the square of a cross-sectional dimension of said medium with respect to said displacement, said first rate of change being greater than said second rate of change, and impact tool means at the free end of said medium.

9. A vibratory device comprising an electromechanical source of periodic mechanical oscillations, means for increasing the amplitude of said oscillations comprising a medium for transmitting said mechanical oscillations attached to said source, said medium being solid at the point of attachment thereof to said source, a portion of said medium decreasing in cross-sectional area as it extends away from said source and having a first rate of change of the transverse cross-sectional area thereof with respect to displacement along the longitudinal axis and a second rate of change of the square of a cross-sectional dimension of said medium with respect to said displacement, said first rate of change being less than said second rate of change, and impact tool means at the free end of said medium.

References Cited in the file of this patent

UNITED STATES PATENTS

| | | |
|---|---|---|
| 2,407,299 | Smith | Sept. 10, 1946 |
| 2,553,251 | Gutterman | May 15, 1951 |